(12) United States Patent
Mu (10) Patent No.: US 9,702,474 B1
(45) Date of Patent: Jul. 11, 2017

(54) LATCH MECHANISM FOR A VALVE ACTUATOR HOUSING

(71) Applicant: Richard Mu, Irvine, CA (US)

(72) Inventor: Richard Mu, Irvine, CA (US)

( * ) Notice: Subject to any disclaimer, the term of this patent is extended or adjusted under 35 U.S.C. 154(b) by 43 days.

(21) Appl. No.: 14/738,686

(22) Filed: Jun. 12, 2015

(51) Int. Cl.
*F16K 27/06* (2006.01)
*F16K 31/44* (2006.01)

(52) U.S. Cl.
CPC .............. *F16K 27/06* (2013.01); *F16K 31/44* (2013.01)

(58) Field of Classification Search
CPC ................................. F16K 27/06; F16K 31/44
USPC .................................................. 251/291–293
See application file for complete search history.

(56) References Cited

U.S. PATENT DOCUMENTS

| | | | |
|---|---|---|---|
| 5,205,534 A * | 4/1993 | Giordani | F16K 31/045 251/129.03 |
| 5,588,637 A | 12/1996 | Carsten et al. | |
| 6,032,922 A * | 3/2000 | Shew | F16K 31/52433 239/526 |
| 6,073,907 A | 6/2000 | Schreiner | |
| 6,206,337 B1 * | 3/2001 | Veillet, Jr. | F16K 31/06 137/78.1 |
| 7,048,251 B2 | 5/2006 | Schreiner | |
| 7,131,635 B2 * | 11/2006 | Oh | F16K 27/0245 251/292 |
| 7,913,972 B2 * | 3/2011 | Parsons | F16K 31/05 251/111 |

* cited by examiner

*Primary Examiner* — Marina Tietjen
(74) *Attorney, Agent, or Firm* — David S. Alavi (57) ABSTRACT

A lower housing assembly for a valve actuator comprises a lower housing and an inventive latch subassembly. The lower housing includes valve stem and mounting post apertures that receive therethrough the valve stem and mounting post of a valve assembled with the lower housing assembly. The inventive latch subassembly comprises a rigid latch lever and a latch bias member. The rigid latch lever pivots between engaged and disengaged positions; the latch bias member biases the latch lever toward the engaged position. In the engaged position, the latch lever obstructs the mounting post aperture to prevent assembly of the lower housing with the valve, or engages a slot in the mounting post to prevent disassembly of the lower valve housing from the valve. In the disengaged position, the mounting post aperture is unobstructed by the latch lever, thereby permitting assembly and disassembly of the lower housing and the valve.

12 Claims, 8 Drawing Sheets

LATCH MECHANISM FOR A VALVE ACTUATOR HOUSING

FIELD OF THE INVENTION

The field of the present invention relates to valve actuators. In particular, a latching arrangement is described herein for a removable valve actuator housing assembly.

BACKGROUND

A number of actuator assemblies exist for valves. Some examples include:
- U.S. Pat. No. 5,588,637 entitled "Auxiliary automatic valve shut-off system" issued Dec. 31, 1996 to Carsten et al;
- U.S. Pat. No. 6,073,907 entitled "Removable and interchangeable valve actuator system" issued Jun. 13, 2000 to Schreiner; and
- U.S. Pat. No. 7,048,251 entitled "Valve with removable actuator" issued May 23, 2006 to Schreiner.

SUMMARY

An apparatus comprises a lower housing assembly for a valve actuator. The lower housing assembly comprises a lower housing and an inventive latch subassembly. The lower housing at least partly defines a housing interior volume and includes valve stem and valve mounting post apertures; the apertures enable passage of the valve stem and valve mounting post into the interior volume when the lower housing is assembled with the valve. The inventive latch subassembly comprises a substantially rigid latch lever and a latch bias member. The rigid latch lever is pivotably connected to an interior surface of the lower housing to pivot between engaged and disengaged positions. The latch bias member applies a bias force urging the latch lever toward the engaged position. In the engaged position, the latch lever (i) obstructs the valve mounting post aperture to prevent entry of the valve mounting post and concomitant assembly of the lower housing with the valve or (ii) engages a slot in the valve mounting post received through the aperture so as to prevent removal of the valve mounting post and concomitant disassembly of the lower valve housing from the valve. In the disengaged position, the valve mounting post aperture is substantially unobstructed by the latch lever, thereby permitting movement of the valve mounting post through the valve mounting post aperture and concomitant assembly and disassembly of the lower housing and the valve.

A method for assembling the lower housing assembly with the valve comprises: (a) with the lower housing assembly and the valve disassembled, moving the latch lever against the bias force from the engaged position to the disengaged position; (b) assembling the lower housing assembly with the valve (i) with the valve stem extending through the valve stem aperture and engaged with the valve actuator subassembly and (ii) with the valve mounting post extending through the valve mounting post aperture; and (c) allowing the latch lever to move in response to the bias force from the disengaged position to the engaged position so that the latch lever engages the slot in the mounting post so as to prevent removal of the valve mounting post from the valve mounting post aperture and concomitant disassembly of the lower valve housing from the valve.

A method for disassembling the lower housing assembly from the valve comprises: (a) with the lower housing assembly and the valve assembled, moving the latch lever against the bias force from the engaged position to the disengaged position, thereby disengaging the latch lever from the slot in the mounting post; (b) disassembling the lower housing assembly with the valve thereby (i) disengaging the valve stem from the valve actuator subassembly and withdrawing the valve stem from the valve stem aperture and (ii) withdrawing the valve mounting post from the valve mounting post aperture; and (c) allowing the latch lever to move in response to the bias force from the disengaged position to the engaged position so that the latch lever at least partly obstructs the valve mounting post aperture so as to prevent passage of the valve mounting post into the interior volume through the mounting post aperture and concomitant assembly of the lower housing with the valve.

Objects and advantages pertaining to a latch mechanism for a valve actuator housing may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically: all features may not be shown in full detail or in proper proportion, certain features or structures may be exaggerated relative to others for clarity, and the drawings should not be regarded as being to scale. The embodiments shown are only examples: they should not be construed as limiting the scope of the present disclosure or appended claims.

DETAILED DESCRIPTION OF EMBODIMENTS

A valve typically includes an internal valve member (e.g., disk, gate, knife, ball, needle, plug, piston, diaphragm, or other) movable from an open position to a closed position and vice versa (and possibly to intermediate positions). The internal valve member typically is coupled to a valve stem that extends out of the valve body; rotation of the valve stem causes movement of the internal valve member. In many instances it may be desirable to actuate the valve (i.e., rotate the valve stem to cause movement of the internal valve member) using control signals applied to an actuator coupled to the valve stem. In many instances such actuators are contained within a housing that, when assembled with the valve, couple the actuator to the valve stem.

Figure 1:
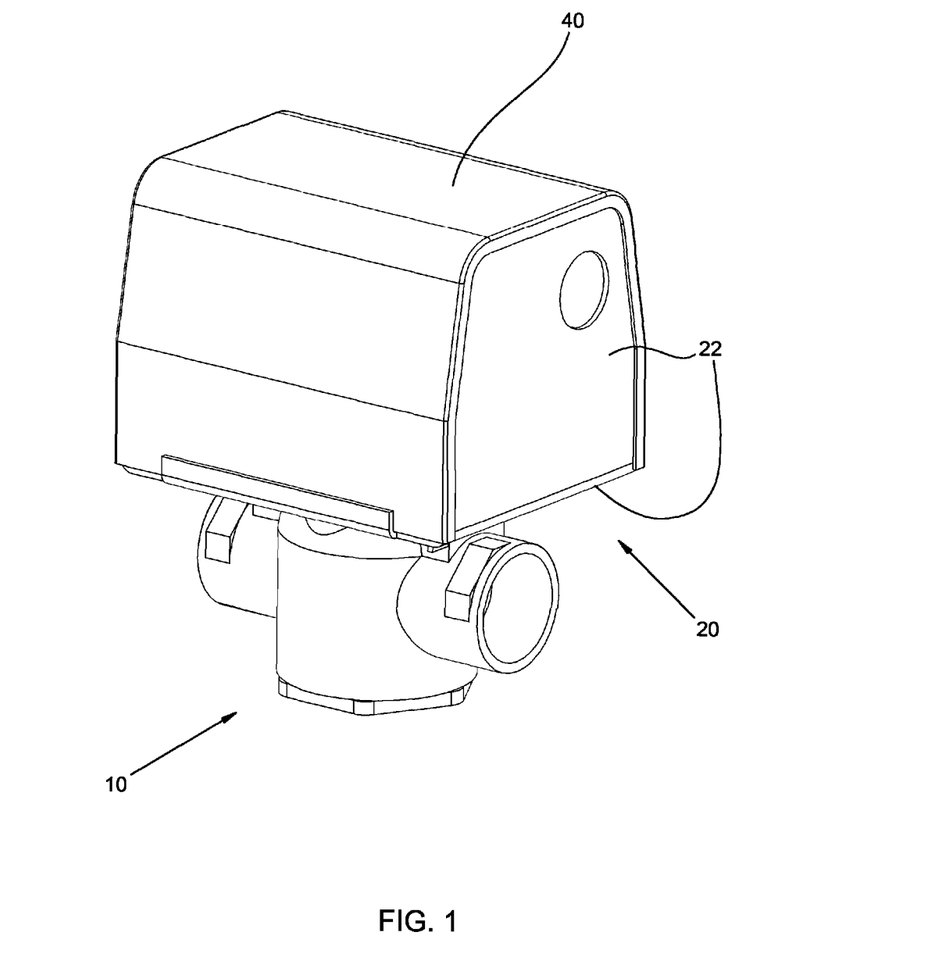
FIG. 1 is a perspective view of a valve assembled with upper and lower housings for a valve actuator.
Figure 2:
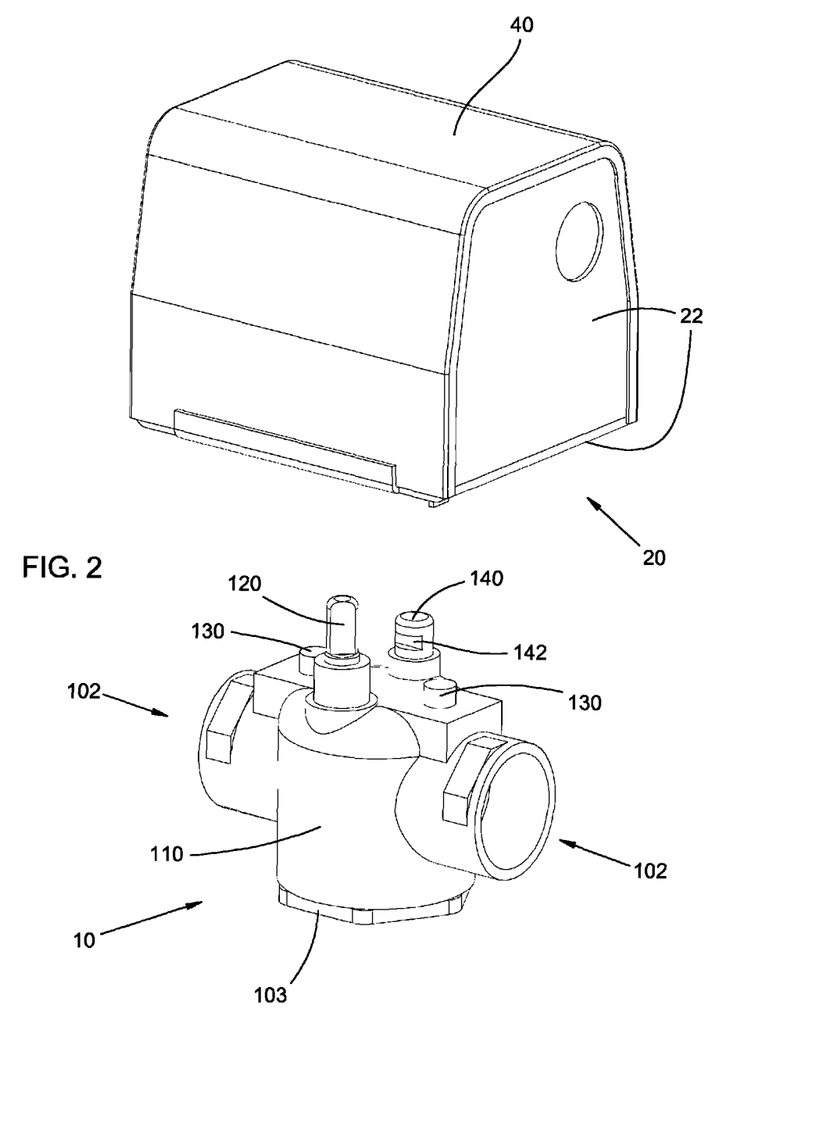
FIG. 2 is a perspective view of the valve disassembled from the lower and upper housings.

FIG. 1 shows an example of a conventional valve actuator housing assembled with a conventional valve 10; FIG. 2 shows the valve actuator housing and the valve 10 disassembled. The valve actuator housing comprises an upper housing 40 and a lower housing assembly 20; the lower housing assembly includes a lower housing 22. The valve actuator housing, and any actuator subassembly or mechanism it encloses, typically are intended to be assembled with and disassembled from the valve 10.

Many examples of conventional valves are structurally adapted to be assembled with and disassembled from a valve actuator housing and the actuator housed therein. As seen most clearly in the lower portion of FIG. 2, the valve 10 comprises a valve body 110 and two ports 102; the valve controls flow between the two ports 102 in a two-way valve; in a three-way valve, the end cap 103 can be removed to provide a third port. The valve stem 120 extends from an upper portion of the valve body 110. Note that directional terms used herein are defined only with respect to the valve 10, with the valve stem 120 extending away from the valve body 110 defining "upward" in the vertical dimension, with the ports 102 defining the longitudinal or forward/backward dimension, and the transverse or right/left dimension being perpendicular to both the vertical and longitudinal dimensions.

A valve mounting post 140 extends upward from the upper portion of the valve body 110 and includes a horizontal slot 142. The upper portion of the valve body 110 can further include mounting bosses 130 or other analogous structural features for engaging and supporting an actuator housing assembled with the valve 10. The mounting post 140 can serve as an anchor for retaining the actuator housing assembled with the valve 10, and can serve to prevent relative rotation of the actuator housing about the valve stem 120 when actuating the valve 10.

Figure 3:
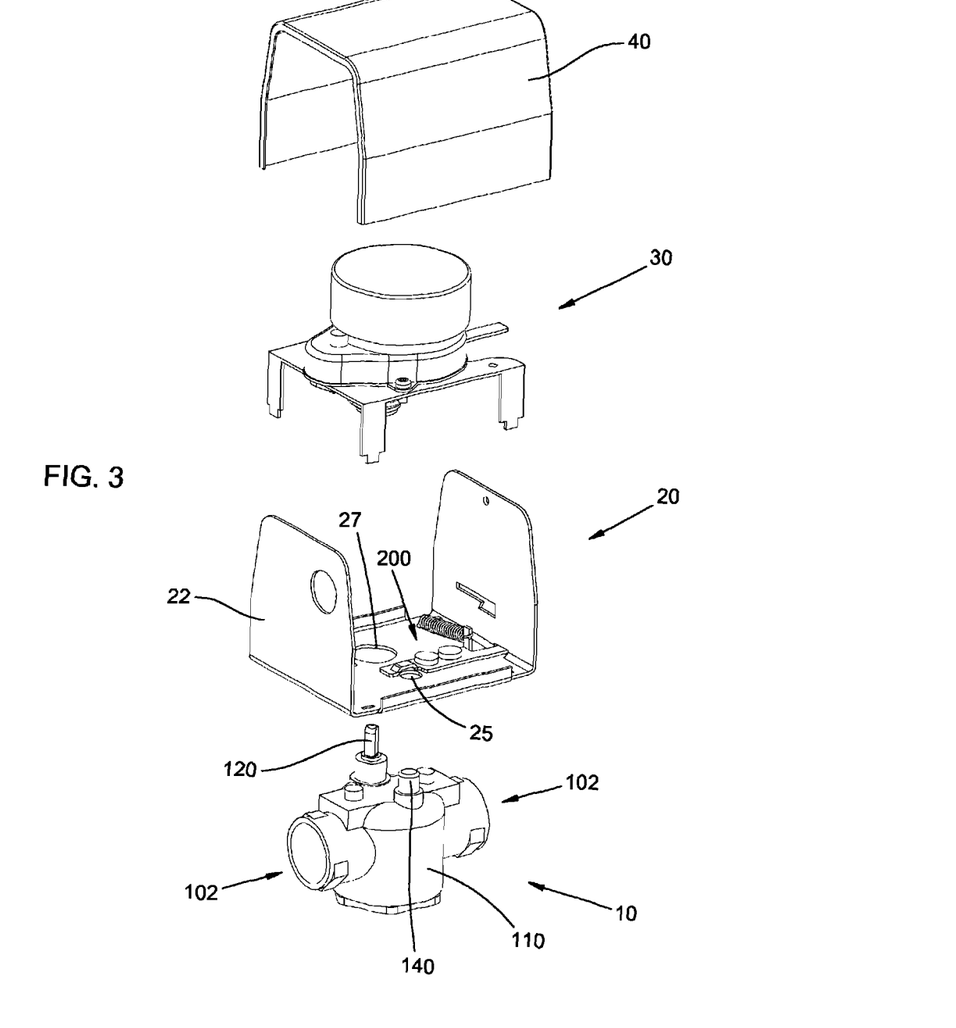
FIG. 3 is an exploded view of the valve, the lower and upper housings, and the valve actuator.
Figure 4:
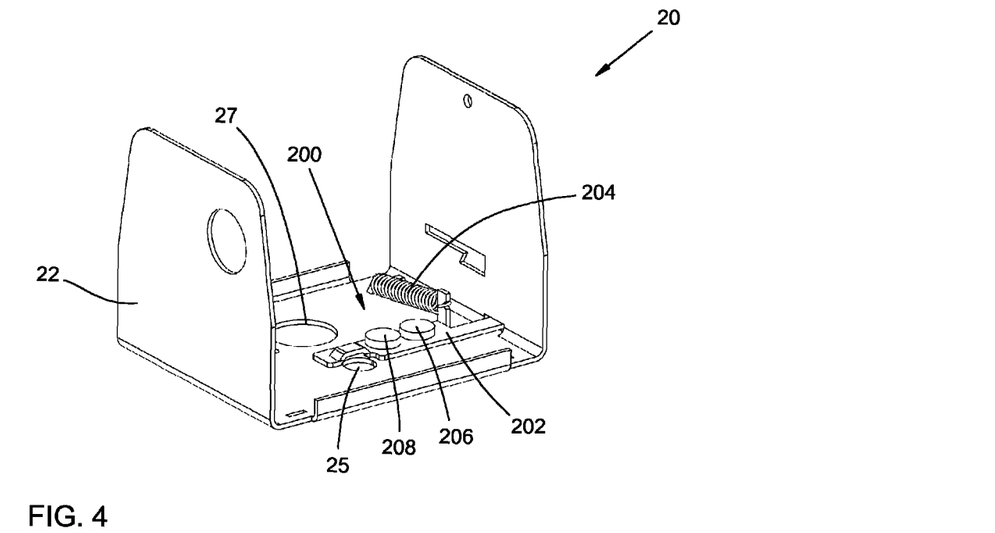
FIG. 4 is a perspective view of the valve and the lower housing disassembled showing details of a latch subassembly.
Figure 5A:
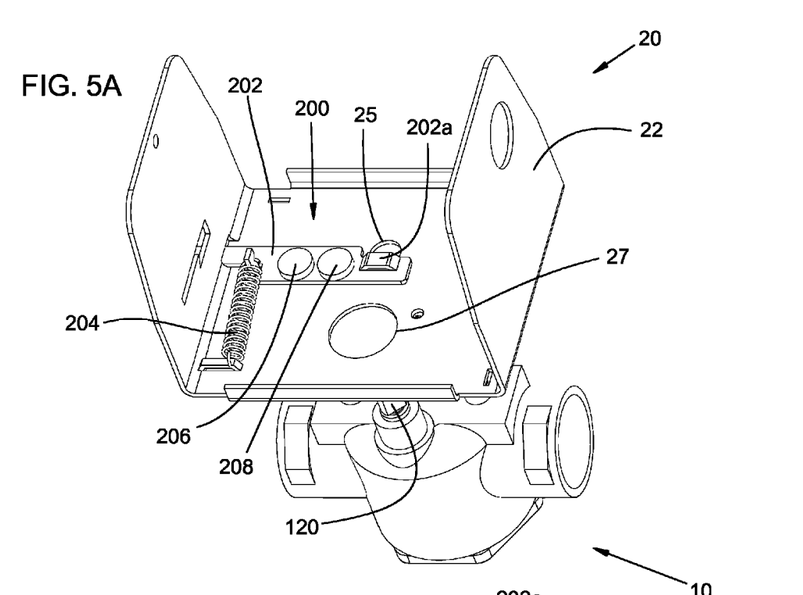
FIGS. 5A through 5D form a sequence of perspective views illustrating engagement or disengagement of an inventive latch subassembly and assembly or disassembly of the valve and the lower housing.
Figure 5B:
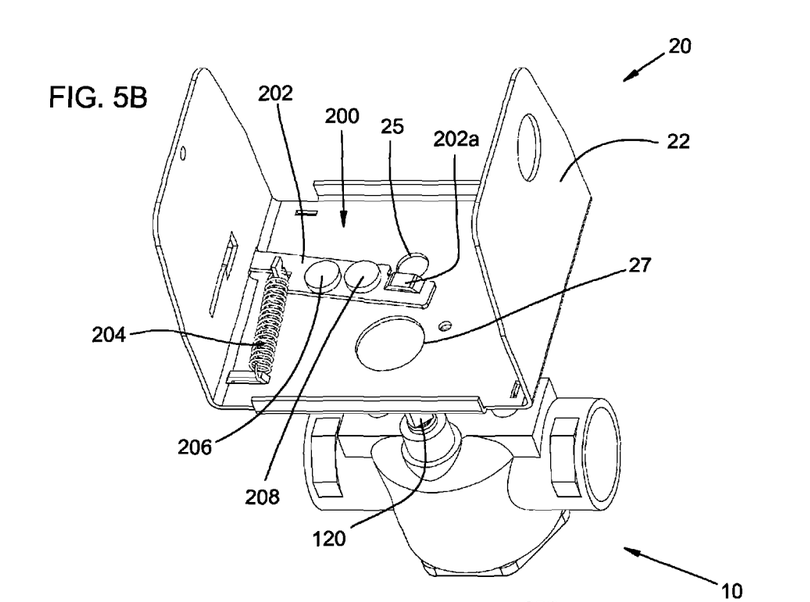
Figure 5C:
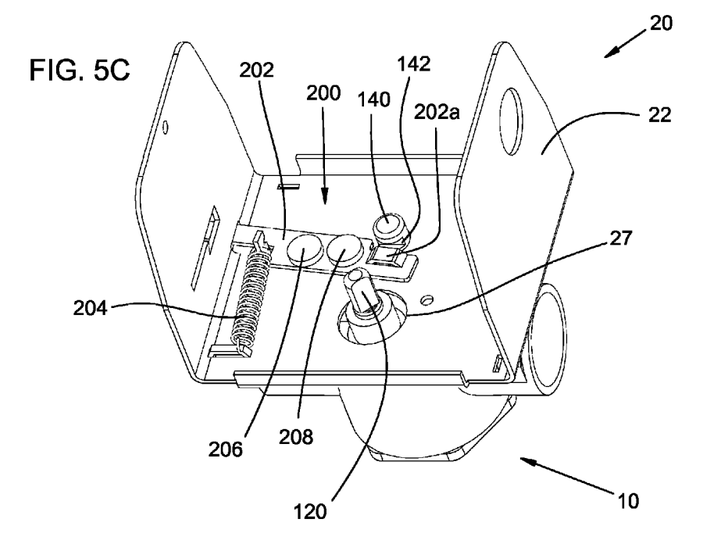
Figure 5D:
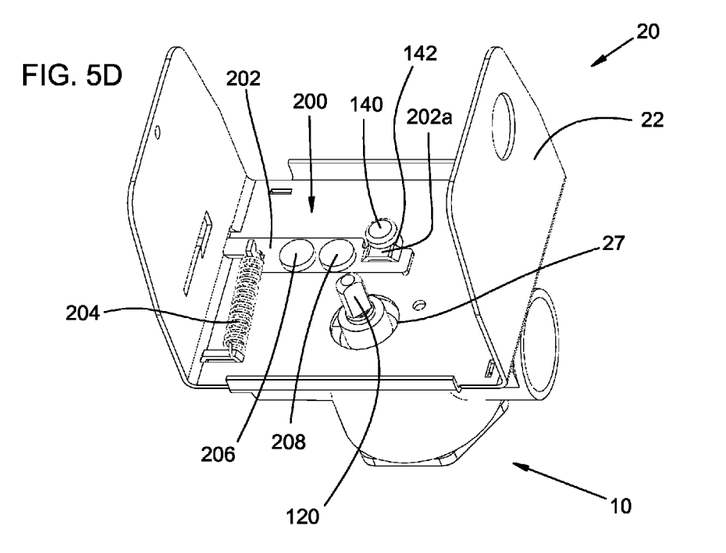
Figure 6A:
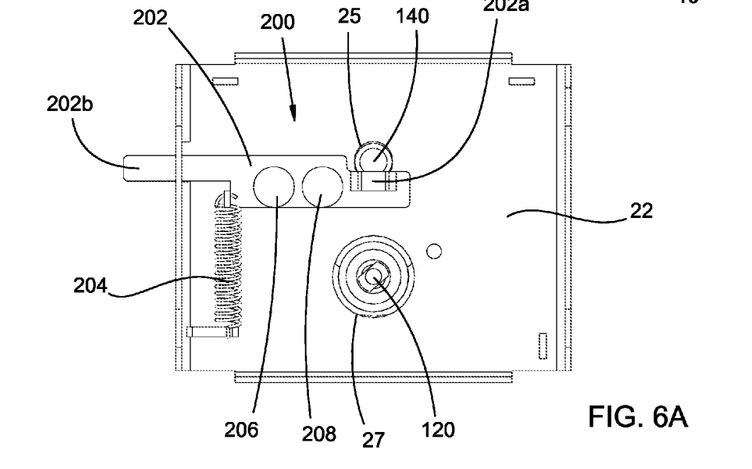
FIGS. 6A through 6D form a sequence of plan views illustrating engagement or disengagement of the inventive latch subassembly and assembly or disassembly of the valve and the lower housing.
Figure 6B:
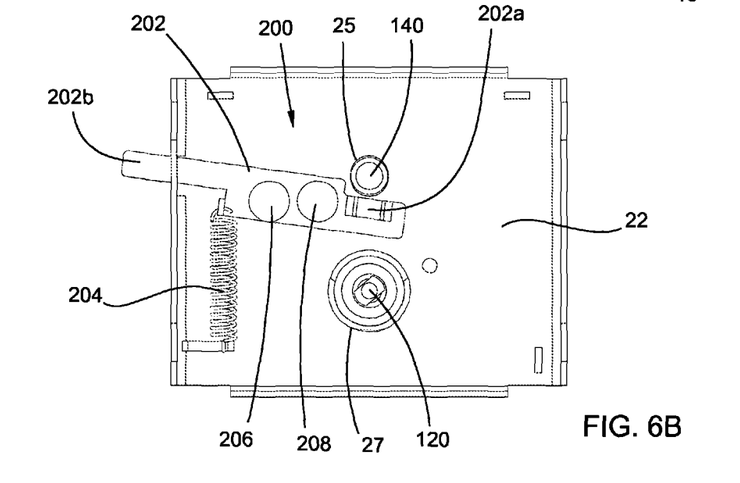
Figure 6C:
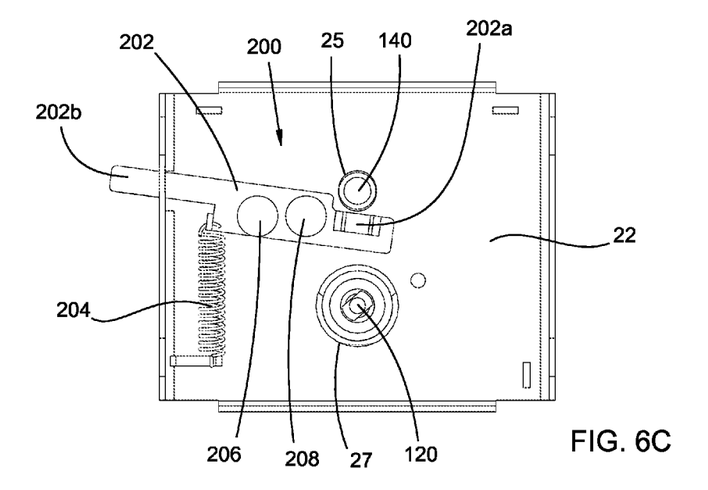
Figure 6D:
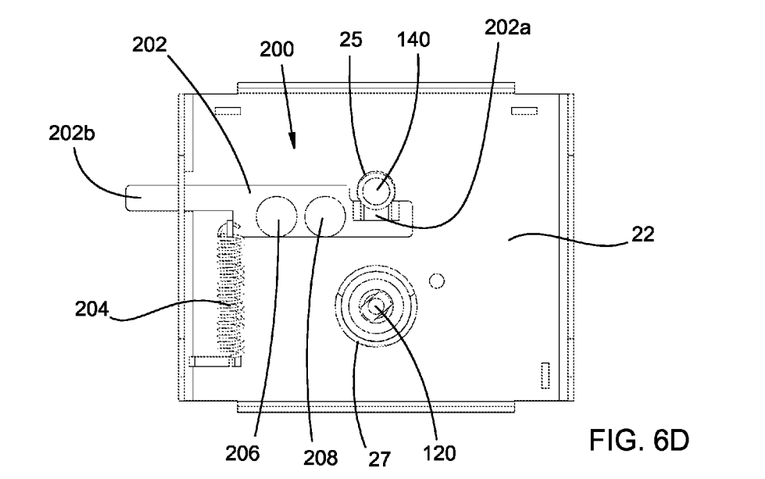

FIG. 3 shows an exploded view of a valve 10, a lower housing assembly 20 for a valve actuator, an upper housing 40, and a valve actuator subassembly 30. The lower housing assembly comprises a lower housing 22 and a latch subassembly 200. The actuator subassembly 30 is mounted within an interior volume defined by the lower housing 22, and can be mounted on the lower housing 22 or the upper housing 40. The valve actuator subassembly 30 is arranged so as to engage, with the lower housing 22 assembled with the valve 10, the valve stem 120 of the valve 10 so as to enable opening and closing of the valve 10 by activation of the valve actuator subassembly 30. The valve actuator subassembly 30 can be of any suitable type and can comprise any suitable arrangement of any suitable combination of any one or more motors, shafts, gears, clutches, transmissions, levers, rods, pistons, chains, belts, and so forth, and can be arranged to respond to any suitable control signal, e.g., electrical (analog or digital), hydraulic, pneumatic, mechanical, and so forth.

The lower housing 22 has a valve actuator aperture 27 and a valve mounting post aperture 25. Upon assembly of the lower housing assembly 20 with the valve 10, the valve mounting post 140 is received through the valve mounting post aperture 25 and extends into the interior volume defined by the lower housing 22. Similarly, upon assembly of the lower housing assembly 20 with the valve 10, the valve stem 120 is received through the valve stem aperture 27 and extends into the interior volume defined by the lower housing 22, where it engages the actuator subassembly 30. The latch assembly 200 is arranged to, inter alia, retain the lower housing assembly 20 assembled with the valve 10 by engaging the transverse slot 142 of the valve mounting post 140 within the interior volume defined by the lower housing 22. Engagement of a latch member in the slot 142 prevents withdrawal of the valve mounting post 140 from the valve mounting post aperture 25 and concomitant disassembly of the lower housing assembly 20 from the valve 10. Resiliently deformable latch members have been employed previously in conventional latch assemblies to engage the slot 142 and enable so-called "push-on" assembly of the actuator housing with the valve 10 (i.e., assembly without requiring any direct manipulation of the latch mechanism; the valve mounting post 140 pushes the resilient latch member out of the way, which then rebounds and engages the slot 142).

An inventive latch subassembly 200 is shown in FIGS. 3, 4, 5A-5D, and 6A-6D. The inventive latch subassembly 200 comprises (i) a substantially rigid latch lever 202 and (ii) a latch bias member 204. The rigid latch lever 202 is connected at a pivotable connection point thereof (e.g., by the pivot pin 206 in the example shown; any suitable arrangement or mechanism can be employed) to an interior surface of the lower housing 22. The latch lever 202 is pivotably movable about the pivotable connection point between an engaged position (FIGS. 5A, 5D, 6A, and 6D) and a disengaged position (FIGS. 5B, 5C, 6B, and 6C). The latch bias member 204 (e.g., a coil spring 204 under tension in the example shown; any suitable arrangement or mechanism can be employed) is structurally arranged so as to apply a bias force that urges the latch lever 202 toward the engaged position.

In the engaged position and without valve 10 assembled with the lower housing 22 (FIGS. 5A and 6A), a first portion 202a of the latch lever 202 at least partly obstructs the valve mounting post aperture 25 so as to prevent passage of the valve mounting post 140 into the interior volume through the mounting post aperture 25 and concomitant assembly of the lower housing 22 with the valve 10. In the engaged position and with the lower housing 22 assembled with the valve 10 and the valve mounting post 140 received through the valve mounting post aperture 25 (FIGS. 5D and 6D), the first portion 202a of the latch lever 202 engages the slot 142 in the valve mounting post 140 so as to prevent removal of the valve mounting post 140 from the valve mounting post aperture 25 and concomitant disassembly of the lower valve housing 22 from the valve 10. In the disengaged position (FIGS. 5B, 5C, 6B, and 6C), the valve mounting post aperture 25 is substantially unobstructed by the latch lever 202, thereby permitting movement of the valve mounting post 140 into (FIGS. 5C and 6C) and out of (FIGS. 5B and 6B) the interior volume through the valve mounting post aperture 25 and concomitant assembly and disassembly, respectively, of the lower housing 22 and the valve 10.

The inventive latch subassembly 200 prevents entry of the valve mounting post 140 through the valve mounting post aperture 25 unless the latch lever 202 is first moved, against the bias force, to its disengaged position; otherwise the rigid latch lever 202 obstructs the valve mounting post aperture 25. So-called push-on assembly is not permitted by the inventive latch subassembly 200. The rigid latch lever 202 also provides more secure retention of the valve mounting post 140 within the aperture 25 with the latch lever portion 202a engaged in the slot 142, compared to a resilient latch member employed in prior actuator housings.

A second portion 202b of the latch lever 202 can extend out of the interior volume defined by the lower housing 22, typically through a slot or other opening in the lower housing 22 (as shown) or the upper housing 40. A sufficient disengaging force can be applied to the second portion 202b of the latch lever 200, outside the housings 22 and 40, to move the latch lever 202 from the engaged position to the disengaged position against the bias force.

In the embodiment shown, the latch subassembly 200 includes a pivot pin 206 that passes through the latch lever 202 at its pivotable connection point and is secured to the lower housing 22. The pivot pin 206 can be structurally arranged in any suitable way so as to provide the pivotable connection of the latch lever 202 to the lower housing 22. The latch subassembly 200 can further comprise a retaining pin 208 that passes through the latch lever 202 and is secured to the lower housing 22. The retaining pin 208 can be structurally arranged in any suitable way so as constrain vertical movement of the latch lever 202 while permitting its horizontal pivoting movement.

The latch subassembly 200 and its components can be formed from any suitable one or more materials. Any suitably strong and rigid one or more materials can be employed for forming the latch lever 202, e.g., metals or alloys, plastics, composites, and the like. It may be convenient to form the latch lever 202 from the same or similar one or more materials from which the lower housing 22 is formed.

In addition to the preceding, the following examples fall within the scope of the present disclosure or appended claims:

Example 1

An apparatus comprising a lower housing assembly for a valve actuator wherein: (a) the lower housing assembly comprises a lower housing and a latch subassembly; (b) the lower housing at least partly defines a housing interior volume and includes a valve stem aperture and a valve mounting post aperture, each of which is sized and positioned so as to receive therethrough and into the interior volume a valve stem and a valve mounting post of a valve, respectively, upon assembly of the lower housing with the valve; (c) the latch subassembly comprises (i) a substantially rigid latch lever that is connected at a pivotable connection point thereof to an interior surface of the lower housing and is pivotably movable about the pivotable connection point between an engaged position and a disengaged position, and (ii) a latch bias member structurally arranged so as to apply a bias force that urges the latch lever toward the engaged position; (d) in the engaged position and with no valve assembled with the lower housing, a first portion of the latch lever at least partly obstructs the valve mounting post aperture so as to prevent passage of the valve mounting post into the interior volume through the mounting post aperture and concomitant assembly of the lower housing with the valve; (e) in the engaged position and with the lower housing assembled with the valve and the valve mounting post received through the valve mounting post aperture, the first portion of the latch lever engages a slot in the valve mounting post so as to prevent removal of the valve mounting post from the valve mounting post aperture and concomitant disassembly of the lower valve housing from the valve; and (f) in the disengaged position, the valve mounting post aperture is substantially unobstructed by the latch lever, thereby permitting movement of the valve mounting post into and out of the interior volume through the valve mounting post aperture and concomitant assembly and disassembly, respectively, of the lower housing and the valve.

Example 2

The apparatus of Example 1 further comprising a valve actuator subassembly mounted within the housing interior volume, wherein the valve actuator subassembly is structurally arranged so as to engage, with the lower housing assembled with the valve, the valve stem of the valve so as to enable opening and closing of the valve by activation of the valve actuator subassembly.

Example 3

The apparatus of any one of Examples 1 or 2 further comprising the valve.

Example 4

The apparatus of any one of Examples 1 through 3 wherein the valve actuator subassembly is mounted on the lower housing within the housing interior volume.

Example 5

The apparatus of any one of Examples 1 through 4 further comprising an upper housing wherein the upper housing and the lower housing are structurally arranged to fit together and engage each other so as substantially enclose the housing interior volume.

Example 6

The apparatus of Example 5 wherein the valve actuator subassembly is mounted on the upper housing within the housing interior volume.

Example 7

The apparatus of any one of Examples 1 through 6 wherein a second portion of the latch lever extends out of the interior volume and is structurally arranged so as to enable movement of the latch lever from the engaged position to the disengaged position against the bias force by application of a disengaging force to the second portion of the latch lever.

Example 8

The apparatus of any one or Examples 1 through 7 wherein the latch subassembly further comprises a pivot pin (i) passing through the latch lever at the pivotable connection point thereof, (ii) secured to the lower housing, and (iii) structurally arranged so as to provide pivotable connection of the latch lever to the lower housing.

Example 9

The apparatus of any one of Examples 1 through 8 wherein the latch subassembly further comprises a retaining pin (i) passing through the latch lever, (ii) secured to the lower housing, and (iii) structurally arranged so as constrain vertical movement of the latch lever while permitting horizontal pivoting movement thereof.

Example 10

The apparatus of any one of Examples 1 through 9 wherein the latch bias member comprises a spring.

Example 11

A method employing the apparatus of any one of Examples 1 through 10, the method comprising: (a) with the lower housing assembly and the valve disassembled, moving the latch lever against the bias force from the engaged position to the disengaged position; (b) assembling the lower housing assembly with the valve (i) with the valve stem extending through the valve stem aperture and engaged with the valve actuator subassembly and (ii) with the valve mounting post extending through the valve mounting post aperture; and (c) allowing the latch lever to move in response to the bias force from the disengaged position to the engaged position so that the latch lever engages the slot in the mounting post so as to prevent removal of the valve mounting post from the valve mounting post aperture and concomitant disassembly of the lower valve housing from the valve.

Example 12

A method employing the apparatus of any one of Examples 1 through 10, the method comprising: (a) with the lower housing assembly and the valve assembled, moving the latch lever against the bias force from the engaged position to the disengaged position, thereby disengaging the latch lever from the slot in the mounting post; (b) disassembling the lower housing assembly with the valve thereby (i) disengaging the valve stem from the valve actuator subassembly and withdrawing the valve stem from the valve stem aperture and (ii) withdrawing the valve mounting post from the valve mounting post aperture; and (c) allowing the latch lever to move in response to the bias force from the disengaged position to the engaged position so that the latch lever at least partly obstructs the valve mounting post aperture so as to prevent passage of the valve mounting post into the interior volume through the mounting post aperture and concomitant assembly of the lower housing with the valve.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise.

In the appended claims, if the provisions of 35 USC §112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An apparatus comprising a lower housing assembly for a valve actuator wherein:
   (a) the lower housing assembly comprises a lower housing and a latch subassembly;
   (b) the lower housing at least partly defines a housing interior volume and includes a valve stem aperture and a valve mounting post aperture, each of which is sized and positioned so as to receive therethrough and into the interior volume a valve stem and a valve mounting post of a valve, respectively, upon assembly of the lower housing with the valve;
   (c) the latch subassembly comprises (i) a substantially rigid latch lever that is connected at a pivotable connection point thereof to an interior surface of the lower housing and is pivotably movable about the pivotable connection point between an engaged position and a disengaged position, and (ii) a latch bias member structurally arranged so as to apply a bias force that urges the latch lever toward the engaged position;
   (d) in the engaged position and with no valve assembled with the lower housing, a first portion of the latch lever at least partly obstructs the valve mounting post aperture so as to prevent passage of the valve mounting post into the interior volume through the mounting post aperture and concomitant assembly of the lower housing with the valve;
   (e) in the engaged position and with the lower housing assembled with the valve and the valve mounting post received through the valve mounting post aperture, the first portion of the latch lever engages a slot in the valve mounting post so as to prevent removal of the valve mounting post from the valve mounting post aperture and concomitant disassembly of the lower valve housing from the valve; and (f) in the disengaged position, the valve mounting post aperture is substantially unobstructed by the latch lever, thereby permitting movement of the valve mounting post into and out of the interior volume through the valve mounting post aperture and concomitant assembly and disassembly, respectively, of the lower housing and the valve.

2. The apparatus of claim 1 further comprising a valve actuator subassembly mounted within the housing interior volume, wherein the valve actuator subassembly is structurally arranged so as to engage, with the lower housing assembled with the valve, the valve stem of the valve so as to enable opening and closing of the valve by activation of the valve actuator subassembly.

3. The apparatus of claim 2 wherein the valve actuator subassembly is mounted on the lower housing within the housing interior volume.

4. The apparatus of claim 1 further comprising an upper housing wherein the upper housing and the lower housing are structurally arranged to fit together and engage each other so as substantially enclose the housing interior volume.

5. The apparatus of claim 4 further comprising a valve actuator subassembly mounted within the housing interior volume, wherein (i) the valve actuator subassembly is structurally arranged so as to engage, with the lower housing assembled with the valve, the valve stem of the valve so as to enable opening and closing of the valve by activation of the valve actuator subassembly, and (ii) the valve actuator subassembly is mounted on the lower or upper housing within the housing interior volume.

6. The apparatus of claim 1 further comprising the valve.

7. A method employing the apparatus of claim 6, the method comprising:
(a) with the lower housing assembly and the valve disassembled, moving the latch lever against the bias force from the engaged position to the disengaged position;
(b) assembling the lower housing assembly with the valve (i) with the valve stem extending through the valve stem aperture and engaged with the valve actuator subassembly and (ii) with the valve mounting post extending through the valve mounting post aperture; and (c) allowing the latch lever to move in response to the bias force from the disengaged position to the engaged position so that the latch lever engages the slot in the mounting post so as to prevent removal of the valve mounting post from the valve mounting post aperture and concomitant disassembly of the lower valve housing from the valve.

8. A method employing the apparatus of claim 6, the method comprising:
(a) with the lower housing assembly and the valve assembled, moving the latch lever against the bias force from the engaged position to the disengaged position, thereby disengaging the latch lever from the slot in the mounting post;
(b) disassembling the lower housing assembly with the valve thereby (i) disengaging the valve stem from the valve actuator subassembly and withdrawing the valve stem from the valve stem aperture and (ii) withdrawing the valve mounting post from the valve mounting post aperture; and
(c) allowing the latch lever to move in response to the bias force from the disengaged position to the engaged position so that the latch lever at least partly obstructs the valve mounting post aperture so as to prevent passage of the valve mounting post into the interior volume through the mounting post aperture and concomitant assembly of the lower housing with the valve.

9. The apparatus of claim 1 wherein a second portion of the latch lever extends out of the interior volume and is structurally arranged so as to enable movement of the latch lever from the engaged position to the disengaged position against the bias force by application of a disengaging force to the second portion of the latch lever.

10. The apparatus of claim 1 wherein the latch subassembly further comprises a pivot pin (i) passing through the latch lever at the pivotable connection point thereof, (ii) secured to the lower housing, and (iii) structurally arranged so as to provide pivotable connection of the latch lever to the lower housing.

11. The apparatus of claim 1 wherein the latch subassembly further comprises a retaining pin (i) passing through the latch lever, (ii) secured to the lower housing, and (iii) structurally arranged so as constrain vertical movement of the latch lever while permitting horizontal pivoting movement thereof.

12. The apparatus of claim 1 wherein the latch bias member comprises a spring.

* * * * *

UNITED STATES PATENT AND TRADEMARK OFFICE
CERTIFICATE OF CORRECTION

| | | |
|---|---|---|
| PATENT NO. | : 9,702,474 B1 | Page 1 of 1 |
| APPLICATION NO. | : 14/738686 | |
| DATED | : July 11, 2017 | |
| INVENTOR(S) | : Mu | |

It is certified that error appears in the above-identified patent and that said Letters Patent is hereby corrected as shown below:

At Column 2 Line 4: replace "with" with --from--.

In Example 5, fourth line, at Column 6 Line 24: insert --to-- after "substantially".

In Example 12, seventh line, at Column 7 Line 24: replace "with" with --from--.

In Claim 4, fourth line, at Column 9 Line 27: insert --to-- after "substantially".

In Claim 8, part (b), first line, at Column 10 Line 29: replace "with" with --from--.

Signed and Sealed this
Fifth Day of December, 2017

Joseph Matal
*Performing the Functions and Duties of the
Under Secretary of Commerce for Intellectual Property and
Director of the United States Patent and Trademark Office*